(12) United States Patent
Newman et al.

(10) Patent No.: US 12,346,348 B2
(45) Date of Patent: Jul. 1, 2025

(54) SYSTEM AND METHOD FOR KNOWLEDGE GRAPH NODE TRAVERSAL RULE VERIFICATION

(71) Applicant: Wells Fargo Bank, N.A., San Francisco, CA (US)

(72) Inventors: David Newman, Walnut Creek, CA (US); Chao Chen, Short Hills, NJ (US); Steven Daryl McCullough, Ithaca, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/493,356

(22) Filed: Oct. 24, 2023

(65) Prior Publication Data

US 2025/0131015 A1 Apr. 24, 2025

(51) Int. Cl.
  *G06F 16/28* (2019.01)
  *G06F 16/248* (2019.01)

(52) U.S. Cl.
  CPC .......... *G06F 16/285* (2019.01); *G06F 16/248* (2019.01)

(58) Field of Classification Search
  CPC .............................. G06F 16/285; G06F 16/248
  See application file for complete search history.

(56) References Cited

U.S. PATENT DOCUMENTS

| | | | |
|---|---|---|---|
| 2021/0294970 A1* | 9/2021 | Bender | G06F 16/3329 |
| 2022/0051665 A1* | 2/2022 | Bade | G06N 7/01 |
| 2022/0237185 A1* | 7/2022 | Portisch | G06F 16/2465 |
| 2022/0398271 A1* | 12/2022 | Wu | G06N 5/025 |
| 2023/0136179 A1* | 5/2023 | Hakimi | G06N 5/02 707/706 |
| 2023/0409728 A1* | 12/2023 | Li | G06F 16/9024 |
| 2024/0121074 A1* | 4/2024 | Adir | H04L 63/0428 |

* cited by examiner

*Primary Examiner* — Dangelino N Gortayo
(74) *Attorney, Agent, or Firm* — SCHWEGMAN LUNDBERG & WOESSNER, P.A.

(57) ABSTRACT

A method may include executing a knowledge graph database query to a knowledge graph database storing properties of entities; receiving a set of tuple results in response to the executing identifying a set of entities and a set of relationships that connect the set of entities in the knowledge graph database; presenting a UI including a graph presentation area that includes: graphical representations of the set of entities in the set of tuple results; and links connecting the representations of the entities according to the set of relationships; performing a classification validation test against the set of tuple results identifying classification properties for entities in a chain of related entities in the knowledge graph database; determining that the chain meets the classification properties for the entities in the chain in the classification validation test; and in response, updating a presentation style of the graphical representations of the set of entities.

20 Claims, 8 Drawing Sheets

SYSTEM AND METHOD FOR KNOWLEDGE GRAPH NODE TRAVERSAL RULE VERIFICATION

Companies may have many subsidiaries and interact with thousands of services. In order to keep track of what services are being provided to which subsidiary a spreadsheet may be used. The spreadsheet may identify other information about a subsidiary or service such as its location, in various examples.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
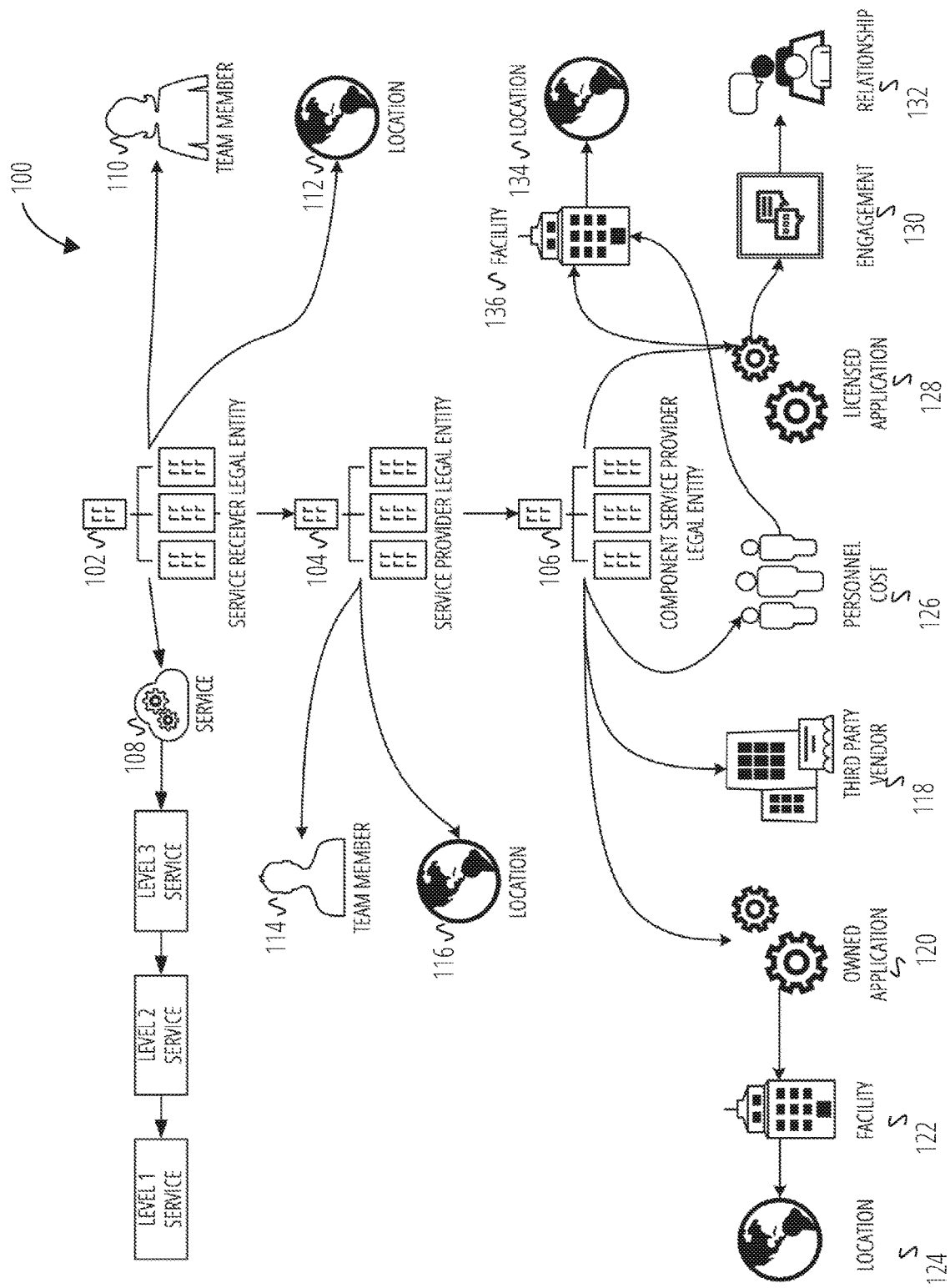
FIG. 1 is an entity link visualization diagram between concepts in a semantic ontology, according to various examples.

In the following description, for purposes of explanation, numerous specific details are set forth in order to provide a thorough understanding of some examples. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces, such as knowledge graph visualizations, are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. For example, a user may view a webpage on their mobile device and a first portion may initially be visible, and then as the user scrolls down the webpage, a second portion may be visible.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes the interactions with the element/portion based on an event handler. For example, a "search" button element may be configured to pass text received in the input element to a search routine that formats and executes a structured query language (SQL) query with respect to a database.

An enterprise (e.g., a company) may have many sub-entities that operate under a main entity. For example, Acme Inc., may have a subsidiary, Little Acme., Inc. For large enterprises there may be hundreds of such entities. An entity may provide services or receive services (and, sometimes, both). A service provider may use other companies to provide portions (e.g., "components") of the provided services, which may be called component service providers. The failure of even one of the component service providers within a large enterprise may have a ripple effect that causes one or more entities of the enterprise to fail (e.g., become unable to perform its functions).

In addition to the problems that may be associated with a disrupted service not working, many enterprises are under regulatory rules to maintain their respective functions and document linkages between the associated entities. Not all entities may be under such rules. Accordingly, some services may be designated as critical or essential. As an extension, service providers and component service providers that support those critical service receivers may also need to be of a higher caliber nature with more robust uptime requirements and, accordingly, may be designated as material.

One possible solution to the challenges posed by large enterprise organizational structures may include use of a manual spreadsheet that attempts to manage the linkages between service providers, service receivers, and component service providers. This approach has several problems, however, including data integrity, data scalability, and data security. For example, spreadsheets are prone to human error, such as incorrect data entry, accidental deletion, or modification of data. This can lead to inconsistencies in the data and make it difficult to trust and make decisions based on the information in the spreadsheet. Additionally, not all spreadsheets are designed to efficiently handle and run complex analysis on large amounts of data. As the number of legal entities (e.g., service providers and service receivers) and relationships between them increases, the spreadsheet can quickly become unwieldy and difficult to navigate. This may make it hard to find the information needed as well as increase the chance for data entry error. Computationally large spreadsheets also require domain expertise to read, write, and understand the underlying data. Domain expertise can become a logistical challenge and enterprise risk when the domain expert is unavailable to process data requests, and contingency measures are not adequate or available. If an essential component or material service provider is unable to perform its function it may be vital that impacted service receivers be identified quickly. Thus, needing a particular person or manually traversing a sprawling spreadsheet may not result in accurate or timely information return.

Accordingly, a more robust, accurate, and efficient system for tracking linkages between service providers, service receivers, and component service providers is needed. By using a different data structure, such as a knowledge graph-which is designed to handle large amounts of data and semantically link and analyze data-many of these issues and disadvantages described herein may be mitigated. This may make it much easier to manage and understand the relationships between legal entities in a business for compliance, risk management and decision-making. Furthermore, by presenting the data in a manner as discussed herein, a user may quickly be able to generate logic rules and view the entities implicated by such rules. In various examples discussed herein, a legal entity may refer to a business, line of business, division, sub-division, corporation, company, association, organization, group, or other business entity. It is appreciated that in various examples discussed herein, a sub-legal entity may be a legal entity that makes up part of a larger legal entity.

FIG. 1 is an entity link visualization diagram between concepts in a semantic ontology, according to various examples. FIG. 1 includes concepts of a service receiver legal entity 102, a service provider legal entity 104, a component service provider legal entity 106, a service 108, a team member 110, a location 112, a team member 114, a location 116, a third party vendor 118, an owned application 120, a facility 122, a location 124, a personnel cost 126, a licensed application 128, an engagement 130, a relationship 132, a location 134, and a facility 136.

The diagram in FIG. 1 may be an abstracted conceptual visualization of data linkages in an semantic ontology. The semantic ontology may be considered a source chain ontology in various examples. The precise names and linkages shown are an example and other names and linkages may be used in other examples. A semantic ontology may be a hierarchy of concepts. A concept may have one or more properties, and each property may have a value type (e.g., string, number, another concept, etc.). At a high level, a semantic ontology allows for generating triples (also referred to tuples herein) that use a subject-predicate-object (SPO) triple to define the relationships between the concepts. A concept may be represented as an entity type in a knowledge graph (as discussed in more detail below). A particular instance of an entity type may be referred to as an entity or object that is stored in the knowledge graph. The subject and object parts of an SPO triple may both be entities. Accordingly, this document will often use language such as a "ABC entity" or "ABC object" as a manner of identifying a particular entity node of the type "ABC."

The triples may be defined in a standardized format specification such as the resource description framework (RDF). The subject, object, and predicate may be a uniform resource identifier (URI), a value, or resource.

For example, a triple may be:
<(website)/legalentity/serviceprovider #entityname>< (website)/legalentity/serviceprovider #location>"123 Main St."

The above triple may be representative of the SPO triple of entity name has a location of "123 Main St". With reference to FIG. 1, service receiver legal entity 102 may be a service provider concept of the triple and location 112 may be the location concept. An extension of RDF is an RDF schema (RDFS), and relatedly the Web Ontology Language (OWL). These define additional syntax vocabularies to allow for more complex relationship definitions for concepts such as classes, subclasses, inheritance, etc. Furthermore, one semantic ontology may link to another entity or import the classes of another base ontology-thereby extending the base ontology.

Entity link visualization 100 may represent the topology of concepts in a service network. As seen, service receiver legal entity 102 may receive (e.g., make use of) service 108. Service receiver legal entity 102 (and service provider legal entity 104) may additionally have one (or more) associated team member 110 entities and associated locations 112 and 116.

A team member entity may correspond to an employee identifier and a location may be an address, in various examples. Service receiver legal entity 102, service provider legal entity 104, and component service provider legal entity 106 may have respective values (not shown in FIG. 1) that correspond to the formal legal name of the corresponding business entity. Service provider legal entity 104 may be a business entity that provides service 108 to service receiver legal entity 102, and component service provider legal entity 106 may be the business entity that provides a component for service 108 to service provider legal entity 104. Service 108 may have additional levels of granularity defined from broadest to narrowest (e.g., from Level 3 to Level 1).

Component service provider legal entity 106 may be associated with many different entities. For example, component service provider legal entity 106 may have an owned application 120 (e.g., an application developed and maintained by that entity, such as a software application) or licensed application 128 (e.g., a third-party application). Either type of application may be hosted by a facility (e.g., facility 122 and facility 136), which in turn have their own locations (e.g., location 124 and location 134). In the instances of licensed application 128, there may be an entity (e.g., engagement 130) that indicates how component service provider legal entity 106 is engaged (e.g., a type of agreement) with licensed application 128 with a subclass of relationship 132. In various examples, component service provider legal entity 106 may utilize a third-party vendor 118. Another entity may store a value of personnel cost 126 (e.g., a percentage of available employee bandwidth/productivity or actual capital expenditures) with respect to component service provider legal entity 106 for service provider legal entity 104.

As indicated above, ontologies may be interconnected. In various examples, the service network ontology as depicted in FIG. 1 may utilize links to a language and country code ontology. Furthermore, it may import (and thus make use of) a corporation specific ontology, which in turn may have imported a subject-matter specific (e.g., medical, financial, educational, etc.) ontology. As previously discussed, FIG. 1 illustrates one example of a visualization of data linkages in an example semantic ontology. The precise names and linkages shown are provided for purposes of explanation, and in various other examples, visualizations may include a variety other names and linkages that are unique and dependent on the particular visualized concepts.

Figure 2:
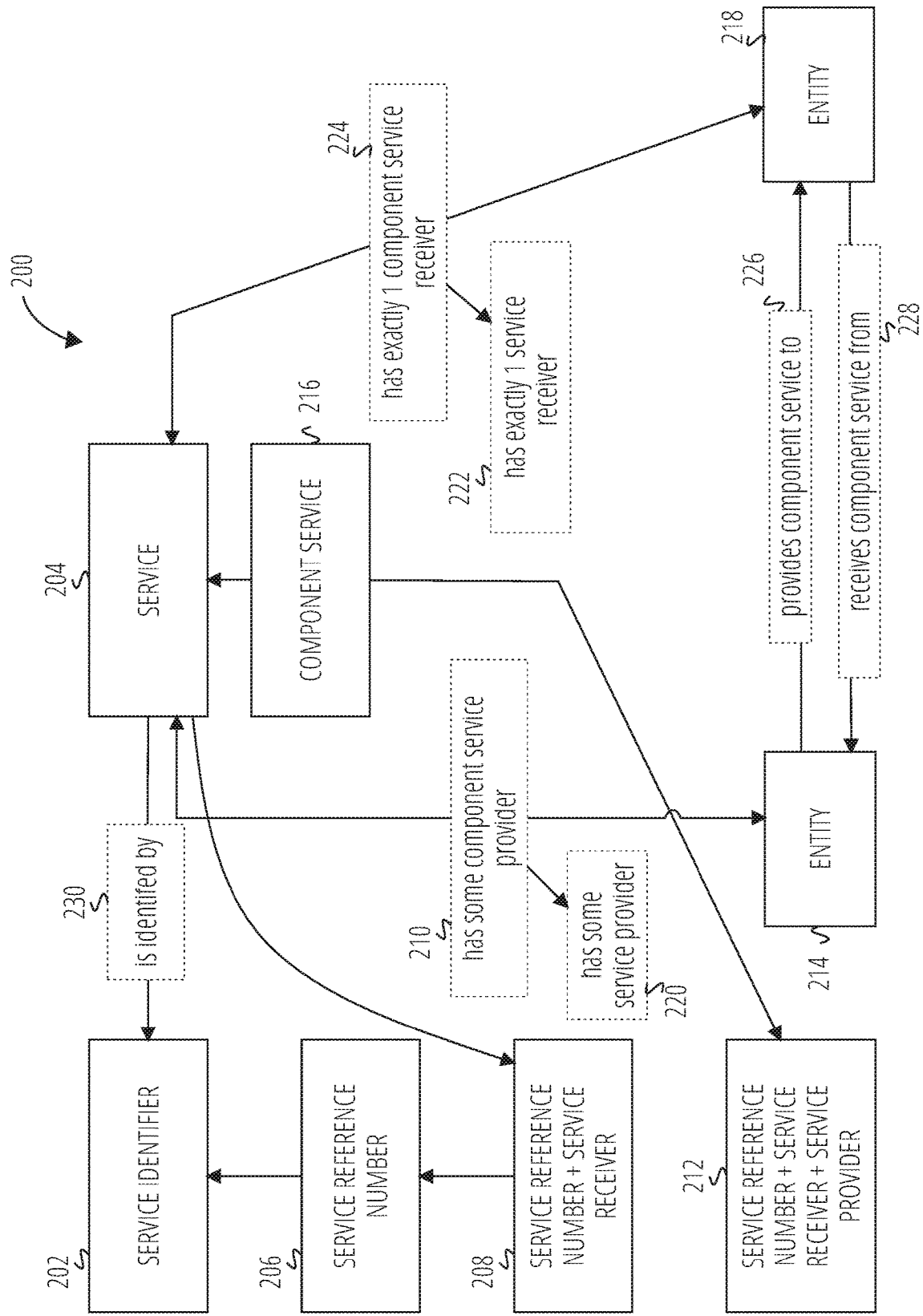
FIG. 2 is a visual representation of an ontology schema, according to various examples.

FIG. 2 is a visual representation 200 of a portion of an ontology schema, according to various examples. Visual representation 200 may be considered the logical definitions that govern an ontology for the entities depicted in FIG. 1. FIG. 2 is presented as a subset of a source chain ontology and includes objects 202 to 218 and properties 220 to 230. For example, service object 204 may have a property (property 230) of "is identified by" service identifier object 202. Thus, a triple within a knowledge graph may be of the form <service object, is identified by, service identifier object>.

Furthermore, some of the links of the visual representation 200 are unlabeled. In these instances, it may be assumed there is "has a" property relationship. For example, service receiver object 206 may have a service identifier object 202 and component object 216 may have an object 212. Object 212 may be a concatenation of three identifiers (e.g., service reference number+service receiver+service provider) that originate from a source chain datafile—similarly object 208 is a concatenation of a service reference number and service receiver.

It may also be seen that properties may also link or be associated with other properties. For example, property 224, which links service object 204 and entity object 218, has its own property 222—and similarly object 210 has property 220. One can also observe the reciprocal nature of relationships as object 214 has a "provides component service to" property 228 with respect object 218, and object 218 has a "receives component service from" property 226 with respect to object 214. The precise descriptions and links in visual representation 200 are an example, and other layouts and property labels may be used.

Figure 3:
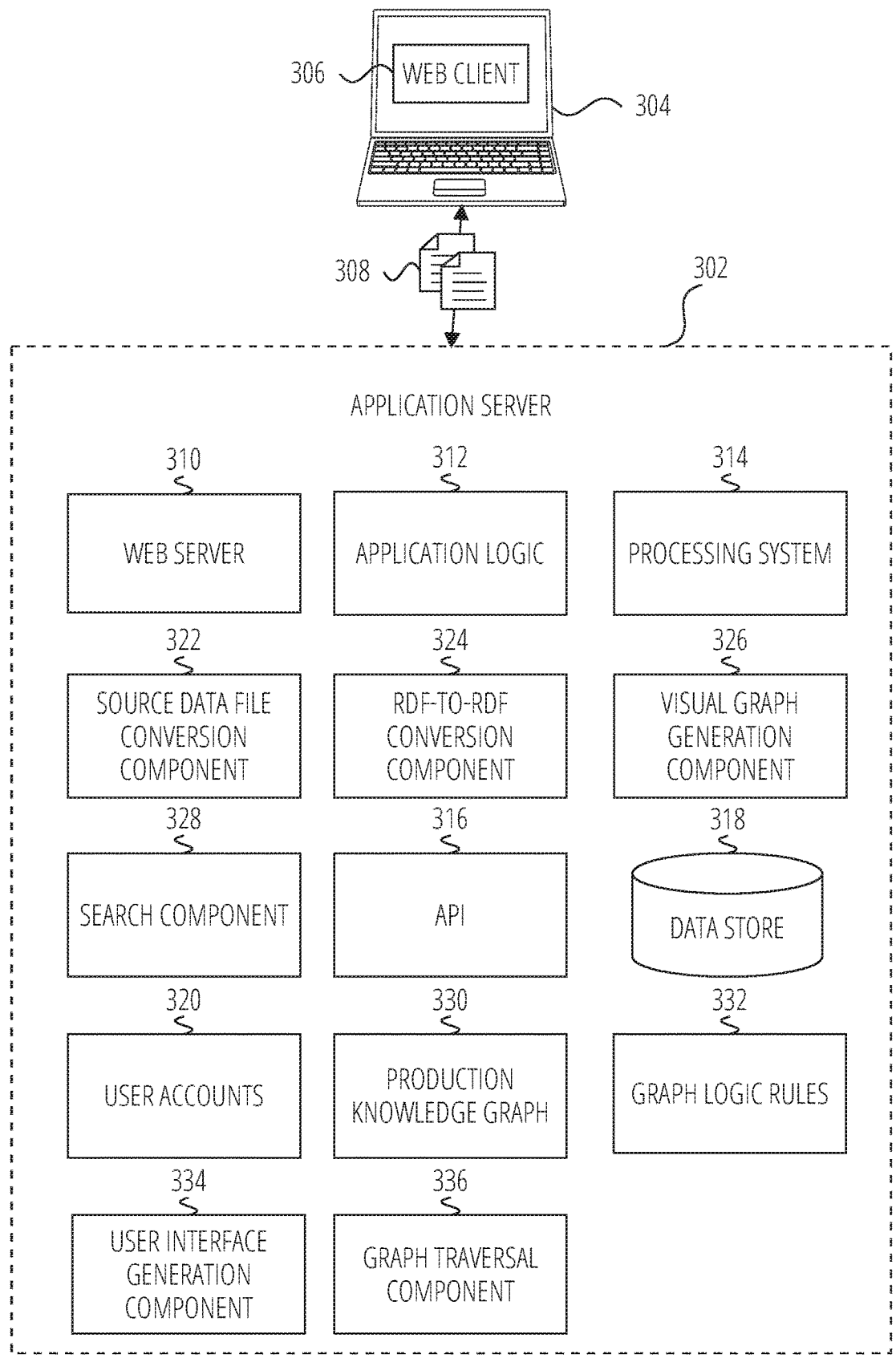
FIG. 3 is an illustration of components of a client device and knowledge graph application server, according to various examples.

FIG. 3 is an illustration of components of a client device and knowledge graph application server, according to various examples. FIG. 3 includes a knowledge graph application server 302, a client device 304, a web client 306, a data 308, a web server 310, an application logic 312, a processing system 314, an API 316, a data store 318, a user accounts 320, a source data file conversion component 322, an RDF-to-RDF conversion component 324, a visual graph generation component 326, a search component 328, a production knowledge graph 330, a graph logic rules 332, and a graph traversal component 336.

Knowledge graph application server 302 is illustrated as set of separate elements (e.g., components, etc.). However, the functionality of multiple, individual elements may be performed by a single element. An element may represent computer program code that is executable by processing system 314. The program code may be stored on a storage device (e.g., data store 318) and loaded into a memory of the processing system 314 for execution. Portions of the program code may be executed in a parallel across multiple processing units (e.g., a core of a general-purpose computer processor, a graphical processing unit, an application specific integrated circuit, etc.) of processing system 314. Execution of the code may be performed on a single device or distributed across multiple devices. In various examples, the program code may be executed on a cloud platform (e.g., MICROSOFT AZURE® and AMAZON EC2®) using shared computing infrastructure.

Furthermore, several functions are discussed as being performed on knowledge graph application server 302 such as data ingestion, data processing, graph manipulations, visualizations, etc. As with the individual elements, these functions may be performed by one or more other servers. For example, one server may primarily be used for responding to visualization requests, and another server may primarily be used for responding to database queries.

Client device 304 may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some examples, computing devices may comprise one or more of a touch screen, camera, keyboard, microphone, or Global Positioning System (GPS) device.

A user may use a device such as client device 304 for a variety of purposes with respect to knowledge graph application server 302. For example, a data scientist may use client device 304 to edit an ontology (e.g., add properties of concept types, add new concepts, etc.). Another user may use client device 304 to query production knowledge graph 330 for a service and see the cost impact on an enterprise. Yet another user may use client device 304 to look at the evaluation of graph logic rules to determine if an entity has the correct classification. Other use cases may be determined by a person having ordinary skill in the art upon review of this disclosure.

Client device 304 and knowledge graph application server 302 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks, or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

In various examples, the communication may occur using an application programming interface (API), such as API 316. An API provides a method for computing processes to exchange data. A web-based API (e.g., API 316) may permit communications between two or more computing devices such as a client and a server. The API may define a set of HTTP calls according to Representational State Transfer (RESTful) practices. For example, A RESTful API may define various GET, PUT, POST, DELETE methods to create, replace, update, and delete data stored in a database (e.g., data store 318). For example, a user may activate a user interface (UI) element to initiate a search of a particular service receiver. In response, an API call may be generated that includes a JavaScript Object Notation (JSON) payload with a service receiver identifier. Knowledge graph application server 302 may receive the API call and, using search component 328, generate and issue a query to data store 318 for information on the service receiver and transmit the query results back to client device 304 for display (as discussed in more detail below). Another API call may be used to evaluate a graph logic rule and return one or more chains of related entities that meet or fail the graph logic rule.

Knowledge graph application server 302 may include web server 310 to enable data exchanges with client device 304 via web client 306. Although generally discussed in the context of delivering webpages via the Hypertext Transfer Protocol (HTTP), other network protocols may be utilized by web server 310 (e.g., File Transfer Protocol, Telnet, Secure Shell, etc.). A user may enter in a uniform resource identifier (URI) into web client 306 (e.g., the INTERNET EXPLORER® web browser by Microsoft Corporation or SAFARI® web browser by Apple Inc.) that corresponds to the logical location (e.g., an Internet Protocol address) of web server 310. In response, web server 310 may transmit a web page that is rendered on a display device of a client device (e.g., a mobile phone, desktop computer, etc.).

Additionally, web server 310 may enable a user to interact with one or more web applications provided in a transmitted web page. A web application may provide user interface (UI) components that are rendered on a display device of client device 304 using user interface generation component 334. The user may interact (e.g., select, move, enter text into) with the UI components, and based on the interaction, the web application may update one or more portions of the web page. A web application may be executed in whole, or in part, locally on client device 304. The web application may populate the UI components with data from external sources or internal sources (e.g., data store 318) in various examples. In various examples, the web application is a dynamic user interface that provides several ways to view and analyze data stored in production knowledge graph 330 as well as quickly ascertain if viewed entities fail or meet a particular graph logic rule. These views and associated functionality are described in more detail with respect to the remaining figures.

The web application may be executed according to application logic 312. Application logic 312 may use the various elements of knowledge graph application server 302 to implement the web application. For example, application logic 312 may issue API calls to retrieve or store data from data store 318 and transmit it for display on client device 304. Similarly, data entered by a user into a UI component may be transmitted using API 316 back to the web server. Application logic 312 may use other elements (e.g., source data file conversion component 322, RDF-to-RDF conversion component 324, visual graph generation component 326, etc.) of knowledge graph application server 302 to perform functionality associated with the web application as described further herein.

Data store 318 may store data that is used by knowledge graph application server 302, such as production knowledge graph 330 and user profiles of user accounts 320. Data store 318 is depicted as a singular element but may in actuality be multiple data stores. The specific storage layout and model used in by data store 318 may take a number of forms-indeed, a data store 318 may utilize multiple models. Data store 318 may be, but is not limited to, a relational database (e.g., SQL), non-relational database (NoSQL) a flat file database, object model, document details model, graph database, shared ledger (e.g., blockchain), or a file system hierarchy. Data store 318 may store data on one or more storage devices (e.g., a hard disk, solid-state drive, random access memory (RAM), etc.). The storage devices may be in standalone arrays, part of one or more servers, and may be located in one or more geographic areas.

User accounts 320 may include user profiles on users of knowledge graph application server 302. A user profile may include credential information such as a username and hash of a password. A user may enter in their username and plaintext password to a login page of knowledge graph application server 302 to access and view their user profile information and/or interfaces presented by knowledge graph application server 302 in various examples.

A user account may also include preferences of the user. The preferences may include default views and default graph visualization options, which may be configurable (e.g., customizable). For example, a user may set the default levels (e.g., the number of links to follow down a graph database) of a visualization to three and set the view to be a service receiver network view. The user account may also identify a role of the user. Different users may have different access rights with respect to data stored in production knowledge graph 330. For example, a data scientist may be able to edit a schema of an ontology, while another user may be able to view service receiver links but not view information on what service providers are considered material or service that are critical. Certain roles (e.g., a legal entity validator role) may enable other user interface panes to be presented. For example, graph logic rules 332 may return information that indicates a rule has been broken, and user interface generation component 334 may present a user interface pane that details the entities associated with the broken rule. Graph logic rules 332 and graph traversal component 336 are discussed in more detail in subsequent figures. In various examples, different access rights for the described operations or data stored in the production knowledge graph (e.g., read, write, modify, delete) provides an advantage and an improvement in security and efficiency. For instance, it gives an organization control to regulate a production knowledge graph to ensure users are genuine about their identity and have the proper amount of trust to perform actions.

Figure 4:
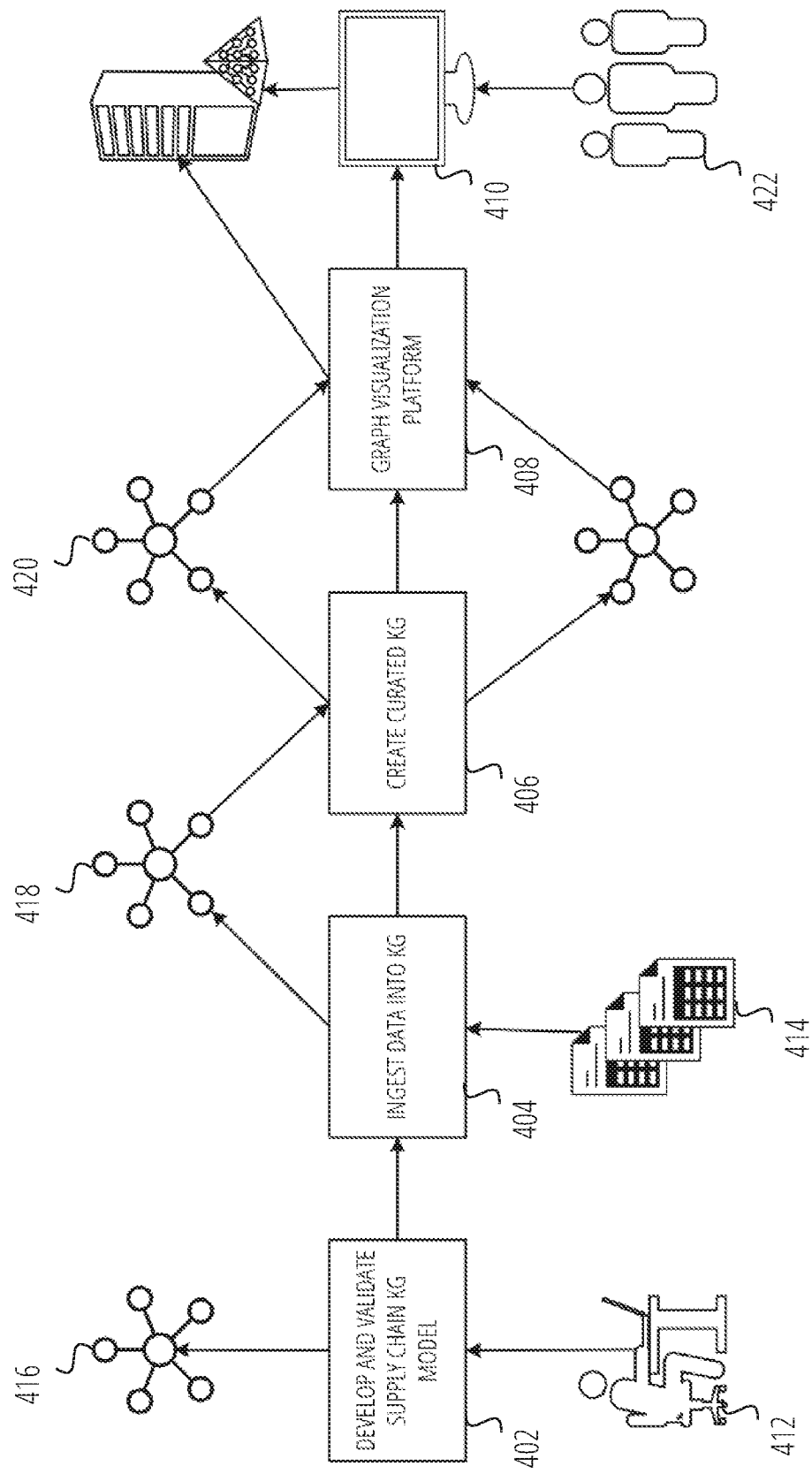
FIG. 4 is a process diagram of generating a knowledge graph database, according to various examples.

FIG. 4 is a process diagram of generating a knowledge graph database such as production knowledge graph 330, according to various examples. FIG. 4 is illustrated as including a develop and validate operation 402, an ingestion operation 404, a curate graph operation 406, a visualization platform 408, a display device 410, data scientist users 412, input data sources 414, a source chain ontology 416, a raw source chain graph 418, a curated source chain graph 420, and end users 422. The operations described with respect to FIG. 4 may be performed by a computing device such as knowledge graph application server 302. For example, ingestion operation 404 may be performed by source data file conversion component 322, curate graph operation 406 may be performed by RDF-to-RDF conversion component 324, and the visualization platform 408 may be implemented by visual graph generation component 326.

As an initial matter, data scientist users 412 may generate a schema, referred to herein as source chain ontology 416. Source chain ontology 416 may be generated in several formats. A schema for an ontology is a set of rules and guidelines that define the structure, content, and relationships of the classes, properties, and individuals (e.g., people, businesses, objects) in the ontology. The schema may provide a formal specification of the ontology that may be used to guide the development, maintenance, and use of the ontology by applications. For example, the schema may describe the concepts in FIG. 1.

The schema for an ontology may be expressed in various ways. For example, in OWL, the schema for an ontology may be expressed using OWL constructs, such as class and property axioms, restrictions, and annotations. In RDF, the schema for an ontology may be expressed using RDF vocabularies, such as RDFS (RDF Schema) and OWL, and may include definitions of classes, properties, and datatypes, as well as other metadata and documentation. Within the context of source chain ontology 416, the schema may identify the various entity type classes such as a service receiver, service provider, component service provider and relationships between such classes. The schema may be based in part on an existing data source (e.g., input data sources 414) such as column headings in a spreadsheet or tables of a relational database. As an example, here is what a Person class and an Organization class may approximately look like in OWL:

---

Class: ex: Person
SubClassOf: owl: Thing
EquivalentTo:
hasFirstName some xsd: string
hasLastName some xsd: string
Class: ex: Organization
SubClassOf: owl: Thing
EquivalentTo:
hasName some xsd: string
hasAddress some ex: Address
hasEmployee only ex: Person
ObjectProperty: ex: hasEmployee
Domain: ex: Organization
Range: ex: Person

---

Ingestion operation 404 may convert the data in input data sources 414 to raw source chain graph 418. Depending on the format of input data sources 414, different algorithms may be executed by source data file conversion component 322 (e.g., as discussed with respect to FIG. 3). For example, if an input source is a spreadsheet in an XLS format, XLS2RDF may be used whereas if an input source is a relational database table, SQL2RDF may be used.

Input data sources 414 may include one or more spreadsheets (e.g., source chain datafiles) that include data identifying properties and links between services, providers, and receivers. The spreadsheets may include several columns. For example, a portion of the spreadsheets may be for service providers and include columns such as "Provider Legal Entity ID" and "Provider Legal Entity Name." A service receiver portion may have columns for "Receiver Legal Entity ID" and "Receiver Legal Entity Name."

Several more columns may be in the spreadsheet that identify locations of the service receivers and service providers and relationship types of the service providers (e.g., inter-company relationship, external relationship, etc.). Service information may also be included in the spreadsheets and include a "Service ID" column and associated information for each legal entity (e.g., location, identifiers, etc.). Accordingly, if one were to read a row it may be determined that for a given service ID, there is a provider legal entity and a receiver legal entity, and component service providers.

Another column may include a classification property, if applicable. For example, services may be classified as "critical" or "non-critical", service providers and component providers may be classified as either "material" or "non-material", and components may be classified as either "essential" or "non-essential." In various examples, the absence of a value may signify the service, service provider, etc., does not have the associated property. Thus, if a criticality column (i.e., to classify a service) does not have a value for a service, it may be assumed that the service is non-critical. Similarly, if a materiality column (i.e., to classify a service provider and component provider) does not have a value for a service provider and component provider, it may be assumed that the service provider and component provider is non-material. Also, if an essential classification column (i.e., to classify a component) does not have a value for a component, it may be assumed that the component is not essential.

The resulting raw source chain graph 418, after ingestion operation 404, may be a graph database that is full of triples based on the data in input data sources 414. The data may be considered raw as it does not yet conform to the source chain ontology 416. Instead, the identification of objects in raw source chain graph 418 may be based on the column headings in input data sources 414. Accordingly, if a heading was "SR_ID" for service receiver ID and "SR_NM" for the service receivers legal name a property may be <SR_ID, has_a, SR_NM>. While this may be technically correct, SR_ID may not appear in source chain ontology 416. Accordingly, a further operation (e.g., curate graph operation 406) may be used to translate raw source chain graph 418 to curated source chain graph 420.

For example, RDF2RDF scripts may be executed that include mappings between the object types, properties, etc., used in raw source chain graph 418 to the source chain ontology 416. Accordingly, triples that conform to source chain ontology 416 may be generated based on the triples in raw source chain graph 418. Furthermore, not all of the data that is in raw source chain graph 418 may be needed in curated source chain graph 420. Accordingly, the scripts may also specify what data to map and what data to ignore. Thus, the resulting curated source chain graph 420 may conform to source chain ontology 416 and be smaller in size (e.g., in bytes) than raw source chain graph 418—thereby saving storage space and increasing the speed of querying.

An additional aspect of curated source chain graph 420 is the inclusion of a graph link type. Graph link types may be classified as either inferred or explicit, in various examples. An explicit graph link type may be one in which the source chain datafile does not have missing link data. For example, if there is a service provider in the source chain datafile there should be an identified link to a component provider somewhere in the source chain datafile. If there is, the graph link type may be explicit. If, however, there is a missing link, scripts may be executed to determine an inferred link between a service provider and component provider (or other missing relationship type).

Curated source chain graph 420 may be used by visualization platform 408 to respond to queries and generate graph visualizations for client devices. For example, end users 422 may login to visualization platform 408 and request the service provider for a service. Visualization platform 408 may query curated source chain graph 420 and generate a graph visualization for display device 410. In various examples, visualization platform 408 may present user interfaces for viewing the results of application of a graph logic rule.

Figure 5:
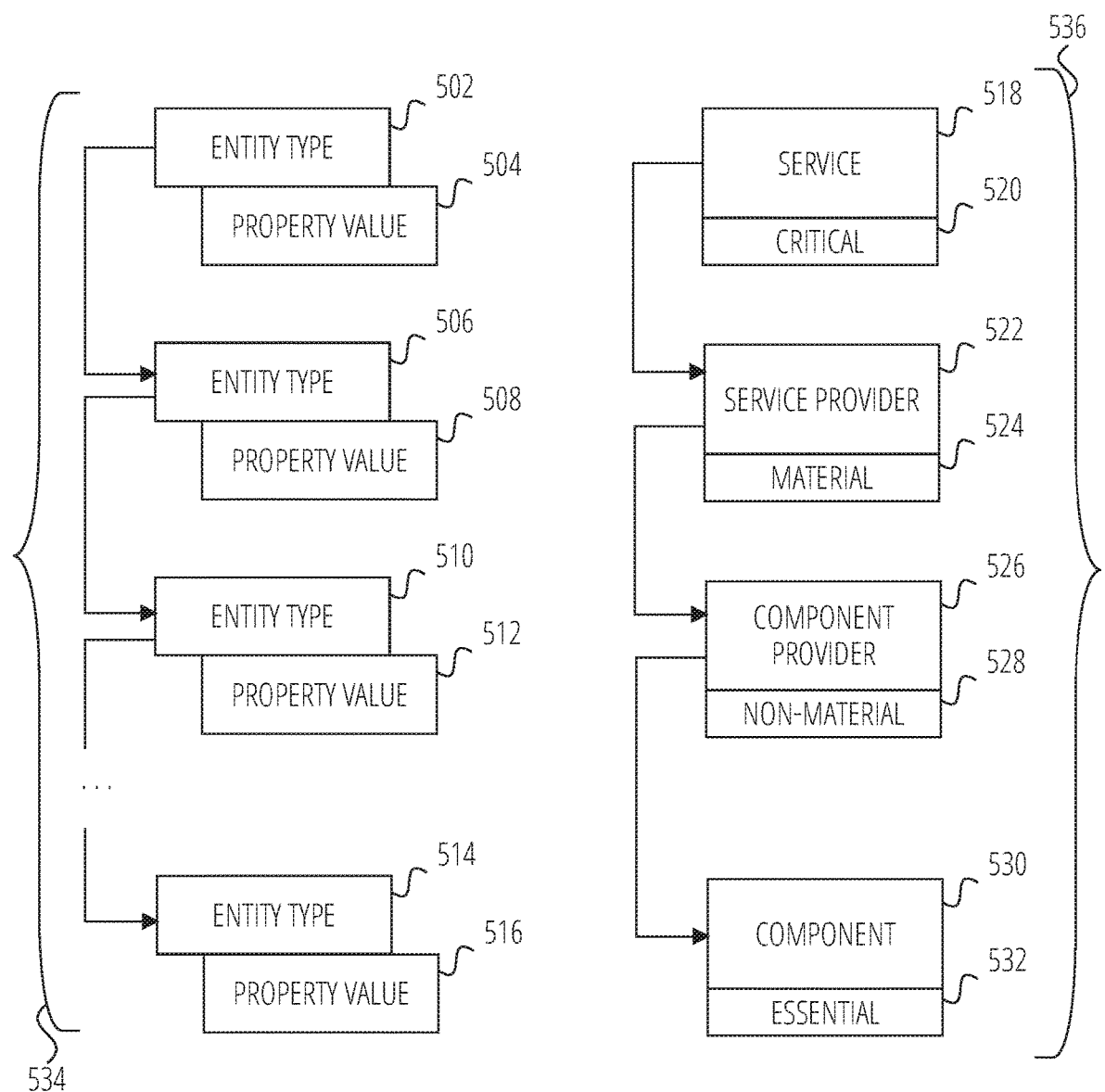
FIG. 5 is a schematic representation of the structure of a graph logic rule, according to various examples.

FIG. 5 is a schematic representation of the structure of a graph logic rule, according to various examples. The representation illustrates an entity type 502, a property value 504, an entity type 506, a property value 508, an entity type 510, a property value 512, an entity type 514, a property value 516, a service entity type 518, a critical property value 520, a service provider entity type 522, a material property value 524, a component provider entity type 526, a non-material property value 528, a component entity type 530, an essential property value 532, a graph logic rule schema 534, and a graph logic rule definition 536. The discussion of FIG. 5 also includes references elements discussed previously with respect to FIG. 3, such as knowledge graph application server 302, data store 318, production knowledge graph 330, user interface generation component 334, and graph traversal component 336.

In various examples, a graph logic rule is one in which a graph pattern is defined across more than one level of a knowledge graph. For example, instead of only checking for a valid property value of one entity type, multiple property values may be checked across a chain of related entities in production knowledge graph 330. That is, not to say that singular logic rules are disallowed, but in the context of this disclosure, a "graph logic rule" is one in which multiple entities and associated property values are tied together.

Graph logic rule schema 534 illustrates an example of a chain of related entities. For example, entity type 502 is tied to entity type 506, which is tied to property value 508, which is eventually, directly or through zero one or more additional entities, tied to entity type 514. "Tied to" may mean that there is a relationship defined in production knowledge graph 330 between the two entity types, such as entity type 502 "provides service to" property value 504, or entity type 502 "employs" property value 504, etc.

For each entity type in the chain, a valid property may be defined. For example, different entity types may have different properties associated with the entity type. The property types associated with each entity type may be stored as part of a semantic ontology schema. For example, a person entity type may have properties of first name, last name, address, etc., whereas a service entity type may include a criticality classification property that is either "Critical" or "Non-Critical." Accordingly, a graph logic rule could indicate that for a service entity type object a valid property value is "critical."

In various examples, user interface generation component 334 may present input elements configured to receive one or more selections of the entity types and the property values. The combination of an entity type and a property value may be considered a rule parameter. A graph logic rule may have any number of parameters, which may evaluate to either TRUE or FALSE. In an example, if any of the number of parameters evaluate to FALSE for a defined chain, then the graphic logic rule is FALSE. For example, consider a graph logic rule that has four rule parameters. If any of the four rule parameters evaluates to FALSE, then the entire graph logic rule is FALSE.

Furthermore, an overall rule evaluation preference may be set indicating whether the graph pattern defined by the parameters should be TRUE or FALSE. For example, a user may define a graph pattern that should not be present in a production knowledge graph 330, and thus the rule should evaluate to FALSE. If it is TRUE, then a user may investigate why the chain of related entities meets the pattern. Conversely, the user may define a pattern of entity types with associated property values that should always be present. Therefore, a graph pattern of entity types should evaluate to FALSE when, for a retrieved chain of the entity types, the property values for the entity types as defined in a graph logic rule do not match the property values of the retrieved chain of entity types. A more detailed example of graph logic rule evaluation is provided further herein.

An example user interface may include a first dropdown menu or text field element used to select (or enter in) an entity type. A second dropdown menu may then be populated with properties of the entity type according to the semantic schema. Then, after knowledge graph application server 302 receives a selection of the property, another input element may be presented configured to receive the value for the property. An additional user interface element may be presented that is configured to receive a graph logic rule description for the rule.

This process may be repeated for each entity type in the desired chain of related entities. For example, if a service entity type is used first, a service provider element may be used second. Again, the types of entities that are valid at each level may be defined in the schema. Thus, a graph logic rule may be considered invalid if the second entity type has no manner to be directly connected to the first entity type.

Furthermore, a user may not be required to enter in a property value at each level of the chain. For example, a graph logic rule pattern may only identify a property value at the first and third levels. Each successive level may be a further traversal down a graph from a head node (level 1). A visualization of levels of a graph is presented in FIG. 6.

More complex rules may be defined using Boolean logic. For example, a default rule may use AND logic such that each and every level must be TRUE for the rule to be evaluated as TRUE. If the default is not used, additional user interface elements may be used to define the Boolean operator for a property value or entity type. Thus, a graph logic rule may indicate that a first entity type should NOT have a certain property.

Graph logic rule definition 536 is an example of a graph logic rule that uses classification properties entity types across four levels of a knowledge graph. Graph logic rule definition 536 is one example, and in other examples other arrangements are possible (e.g., one level, two levels, three levels, etc.). Additionally, graph logic rule definition 536 may be one that should not be present in production knowledge graph 330. Accordingly, if graph logic rule definition 536 evaluates to TRUE it may be assumed that production knowledge graph 330 includes a potential error that warrants investigation.

For example, the graph logic rule begins and indicates that service entity type 518 is the first level (e.g., the head node) and has a critical classification property value 520 of "Critical." Service entity type 518 is connected to service provider entity type 522, which is at the second level. Graph logic rule definition 536 indicates that service provider entity type 522 has a material classification property value 524 of "Material." Service provider entity type 522 is connected to component provider entity type 526 at the third level. The non-material classification property value 528 is indicated as "Non-Material." Finally, component provider entity type 526 is connected to component entity type 530 at the fourth level. The essential classification property value 532 is indicated as "Essential." Thus, production knowledge graph 330 should not have a chain of related entities in which a non-material component provider is connected to an essential component, and where the non-material component provider is also connected to a material service provider, that in turn is connected to a critical service.

Graph traversal component 336 may evaluate (e.g., determine TRUE or FALSE) graph logic rules dynamically (e.g., at the time of a user search of production knowledge graph 330), or periodically (e.g., daily, weekly, monthly). For example, graph traversal component 336 may use a depth-first search (DFS) of production knowledge graph 330. A DFS starts at a source vertex (e.g., entity type node) and explores as far as possible along each branch of a graph before backtracking up the graph. Other graph traversal methods may also be used, such as breadth-first search. A breadth-first search begins at a root of the tree (e.g., graph) and expands to explore all nodes at the present depth first, before moving to nodes at the next depth level, and so on.

For a rule, such as graph logic rule definition 536, and using DFS, graph traversal component 336 may, for each "critical" service in production knowledge graph 330, traverse down the graph to each service provider with a "material" classification. Then, graph traversal component 336 may find each "non-material" component provider, Finally, down one last level, it may find components with the "essential" property of the "non-material" component provider. If graph traversal component 336 reaches a component without the "essential" property, graph traversal component 336 may move back up the graph to the "nonmaterial" component provider level and proceed back down to the next component.

Graph traversal component 336 may be implemented as part of a graph database management system (GDBMS) that governs interactions with production knowledge graph 330. Queries may be issued to production knowledge graph 330 using a query language supported by the GDBMS. For example, the Neo4j GDBMS supports the Cypher query language. Protocol and RDF Query Language (SPARQL) is another query language that may be used by a GDBMS.

Accordingly, with respect to graph logic rule definition 536, a graph query may be formulated by knowledge graph application server 302 that queries production knowledge graph 330 for the existence of a service, service provider, component provider, and component with the identified classification property values. If the result is null (e.g., nothing found) it may be assumed that there is no chain of related entities that meet graph logic rule definition 536. If there are results, the entities and identifiers of the entities may be stored in data store 318 as associated with graph logic rule definition 536.

Users may interface with a production knowledge graph-production knowledge graph 330—in several manners. For example, a user may search for entity types that are stored in the production knowledge graph such as service receivers, service providers, component objects, licensed applications, etc. The results of the search may be presented as graphical representations of entities (e.g., nodes) and links (e.g., properties) between them in a graph presentation area on a display device of a client device (e.g., via web client 306). Depending on the searched for type of entity, the hierarchy of the results may differ. For example, if a service provider is searched, the head node of a presented graph may be a service provider and the relationships with child nodes may be described with respect to the service provider. If a component object is searched, the component may be the head node and the relationships with child nodes may be described with respect to the component.

Figure 6:
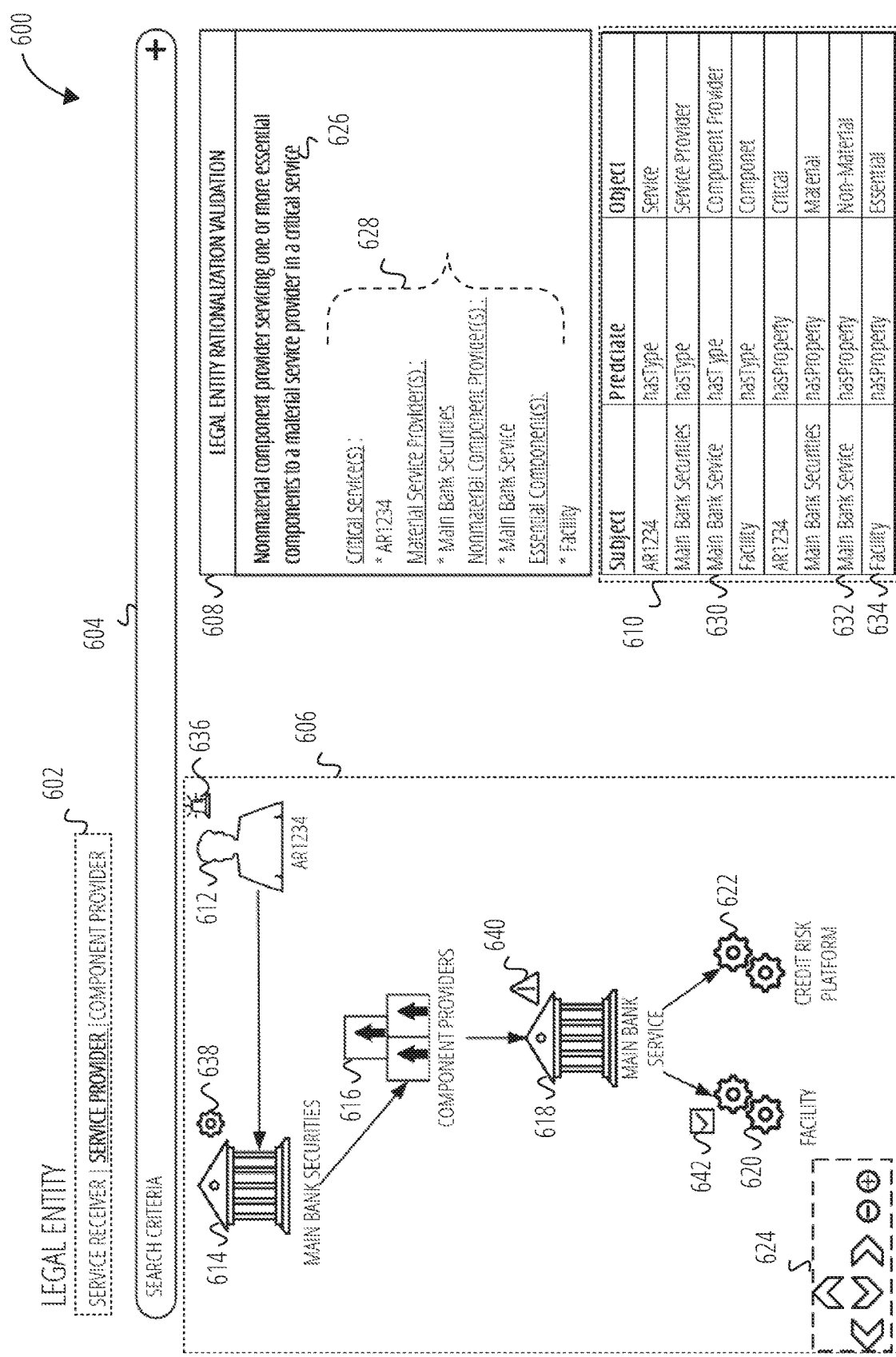
FIG. 6 is a graph visualization user interface, according to various examples.

FIG. 6 is a graph visualization user interface 600, according to various examples. The user interface 600 includes a graph type selector 602, a search toolbar 604, a graph presentation area 606, a graph logic rule pane 608, a graph triple table 610, a service 612, a service provider 614, a component provider group 616, a component provider 618, a component 620, a component 622, a graph navigation controls 624, a graph logic rule description 626, a graph logic rule validation details 628, a triple row 630, a triple row 632, a triple row 634, a property indicator 636, a property indicator 638, a property indicator 640, and a property indicator 642. The display of, and interactions with, user interface 600 are described in the context of the use of elements of knowledge graph application server 302 as depicted in FIG. 3 such as data store 318, user accounts 320, visual graph generation component 326, production knowledge graph 330, graph logic rules 332 and graph traversal component 336.

Graph type selector 602 identifies some of the different types of graphs that may be presented in graph presentation area 606. The types of graphs may use the same underlying knowledge graph in various examples, such as production knowledge graph 330. The type of graph may refer to the perspective on which the graph is visualized in graph presentation area 606 and what search input elements are included in search toolbar 604. For example, the underlining of "Service Provider" in graph type selector 602 indicates that the interface is currently configured to search for and present a graph from the perspective of a search provider in graph presentation area 606. A user may select another graph type (e.g., component provider) to be taken to a search interface for the selected graph type.

Knowledge graph application server 302 may store data on a number of graph types. As part of this storage, a graph type may include configuration data and presentation data for the graph type and the entities. The configuration data may identify the entity types at each level of the graph and what queries to execute to retrieve data for presentation within graph presentation area 606.

The number of levels discussed below are examples, and others may be used. The configuration data of a service provider network graph type may identify a service provider legal entity as the head node with child nodes of service receivers and component providers. A user may then expand the service provider network by clicking (e.g., using an input device such as a mouse, or a finger when using a touch-enabled display device) either of those child nodes to display service receivers and component providers, respectively. Accordingly, when a service provider search is requested, a graph database query (e.g., SPARQL or Cypher query) may be executed that retrieves a service provider for a service provided and one or more component providers to the service provider. The presentation data may include what icons to use for which types of objects and the style (e.g., color, thickness, solid, dotted, etc.) of the links between objects.

There may be several other types of graph types, such as a service receiver, a component network, a service network, and a cost network. For example, for a service receiver network, the configuration data may identify the head node as a legal entity that receives a service, a second level being a service provider, and a subsequent level being component providers.

The configuration data for a component network graph type may use a legal entity of a component provider as the head node, a service provider object that uses the component provider at the second level, service identifiers received at a third level, regions (e.g., geographic regions) at a fourth level, and those entities that use the service in the region in a fifth level. A service network graph type may use a service identifier at the head node, a legal entity object at the second level, and service relationships and components at a third level. The child nodes of the components may be personnel costs objects (e.g., used to calculate the amount of work units a service needs or uses). A cost network may use a personnel cost object as the head node with services associated with the cost object at a second level.

The configuration data may also indicate what search fields are presented in search toolbar 604. For example, for the service receiver network, there may be a service receiver input element and a service identifier input element. For a service provider network type, there may be a service provider input element and service identifier input element. A component graph type may have a single input element for the component name.

With reference back to user interface 600, a simplified (for discussion purposes) service provider graph is displayed in graph presentation area 606. The process of searching for service provider 614 is not illustrated, but, nevertheless, consider that a user has entered in an input string of "Main Bank", and then selected "Main Bank Securities" (service provider 614), and then selected service "AR1234" (service 612). For visualization purposes, service receives of service provider 614 are not illustrated.

The graph may be presented in several manners by visual graph generation component 326. Separately from the graph type in graph type selector 602, a user may select visualization and layout options. For example, a graph layout selection element (not shown) may present an option to use a tabular view of the results instead of a visual graph that includes graphical representations of entities as nodes, etc. Other visualization options may include graph navigation controls 624 to zoom and pan around the graph, or an option to turn on or off edge labels that identify the relationship between nodes. Different graph visualization platforms may be used to generate the nodes in graph presentation area 606 (e.g., Neo4j Bloom or Gephi). A user may interact with the nodes in graph presentation area 606 in several manners. For example, a user may move the nodes by performing a click-hold-drag operation using an input device such as a mouse or a finger when using a touch-enabled display device. As a user moves a node, the edges connecting the node may move as well.

As discussed above, there may be a variety of visualization options with respect to knowledge graph visualization. For example, the visualization options may be segmented into two classes: graph options and information panes. For example, graph options may include presenting additional information or changing styles of links in graph presentation area 606 with respect to the visualization of entity types and their links, such as presenting inferred links. Information panes may present additional information related to what is shown in graph presentation area 606. For example, there may be an information pane such as graph logic rule pane 608. The panes may be overlaid on graph presentation area 606 or adjacent to the graph presentation area 606 as shown in user interface 600, in various examples.

Knowledge graph application server 302 may store access control lists (ACLs) with respect to the graph and visualization options. An ACL may identify an option and a list of roles or user identifiers that are authorized to use the option. Alternatively, or in addition to an ACL, a user profile may identify the options that the user that is associated with the user profile is authorized to use. For example, user interface 600 includes graph logic rule pane 608. In order to view graph logic rule pane 608, either the role of a user or a user identifier in user accounts 320 should be included in an ACL with respect to viewing graph logic rules.

As part of being authorized, graph presentation area 606 may include additional graphics (e.g., icons) based on a value of a classification property of an entity, such as property indicators 636, 638, 640, and 642. Property indicator 636 may be based on service 612 having a "critical" classification, property indicator 638 may be based on service provider 614 having a "material" classification, property indicator 640 may be based on component provider 618 having a "non-material" classification, and property indicator 642 may be based on component 620 having an "essential" classification, for example.

The precise property indicators displayed are examples—as are the locations of the property indicators—and other property indicators may be used. The additional graphics may also take the form of a colored outline around the representations of an entity (e.g., service 612) or another visual signifier. In various examples, the additional graphics may not always be displayed. A user may use a UI toggle (not shown) to turn on and off the display of the additional graphics.

The presence of the additional graphics may be based on an evaluation of a graph logic rule. For example, as discussed above with respect to FIG. 5, graph traversal component 336 of FIG. 3 may periodically evaluate each graph logic rule and store the results. If a chain of related entities is in the results, it may be stored in data store 318 as associated with the graph logic rule. As part of this storage, the identifiers of each of the entities in the chain of related entities may be stored. Therefore, a query may be made to data store 318 to determine if any of the identifiers of entities in graph presentation area 606 have been identified in a chain of related entities associated with a stored graph logic rule. Consequently, information associated with any implicated graph logic rules of the entities displayed in graph presentation area 606 may be retrieved without requiring evaluation of the graph logic rules at the time of presentation. Alternatively, graph traversal component 336 may dynamically evaluate any stored rule stored in graph logic rules 332 against the triples.

In the case of FIG. 6, the entities in graph presentation area 606 meet the criteria (e.g., evaluate to TRUE) of a graph logic rule. More specifically, graph logic rule pane 608 identifies the rule using graph logic rule description 626 and details of the evaluation in graph logic rule validation details 628. Graph logic rule validation details 628 include identifications of the entities at each level of the graph logic rule that appear in graph presentation area 606. For example, consider that that graph logic rule is based on graph logic rule definition 536 as discussed in FIG. 5. As there are four levels in graph logic rule definition 536, graph logic rule validation details 628 may include four levels. Graph logic rule description 626 may be the same as a stored description for graph logic rule definition 536.

Graph triple table 610 is an example of the underlying data that may be returned in response to a user search to generate graph presentation area 606. In various examples, graph triple table 610 is not displayed as part of user interface 600 but is included herein for explanation purposes. The triples are data that may originate from production knowledge graph 330. For example, triple row 630 indicates that Main Bank Service has a type of "component provider", and triple row 632 indicates that Main Bank Service has a property of "Non-Material." Thus, in graph presentation area 606, Main Bank Service (e.g., component provider 618) includes property indicator 640 corresponding to the "Non-Material" status. As another example, triple row 634 indicates that "Facility" has a property of "Essential". Accordingly, component 620 includes property indicator 642 which may correspond to the "Essential" classification property for a component.

In various examples, a user may interact with the property indicators to view the chain of related entities identified in graph logic rule validation details 628. For example, in a large visualization where multiple graph logic rules are implicated or where there are hundreds of displayed entities, it may be difficult for a user to track the entities for a particular graph logic rule. A user may click (e.g., using an input device such as a mouse, or a finger when using a touch-enabled display device) on a property indicator to have the links between the chains of related entities change presentation style. For example, if property indicator 642 is clicked, the links between component 620 and component provider 618, component provider 618 and component provider group 616, component provider group 616 and service provider 614, and service provider 614 to service 612 may turn red (or other visual change, e.g., color, pattern, etc.).

Figure 7:
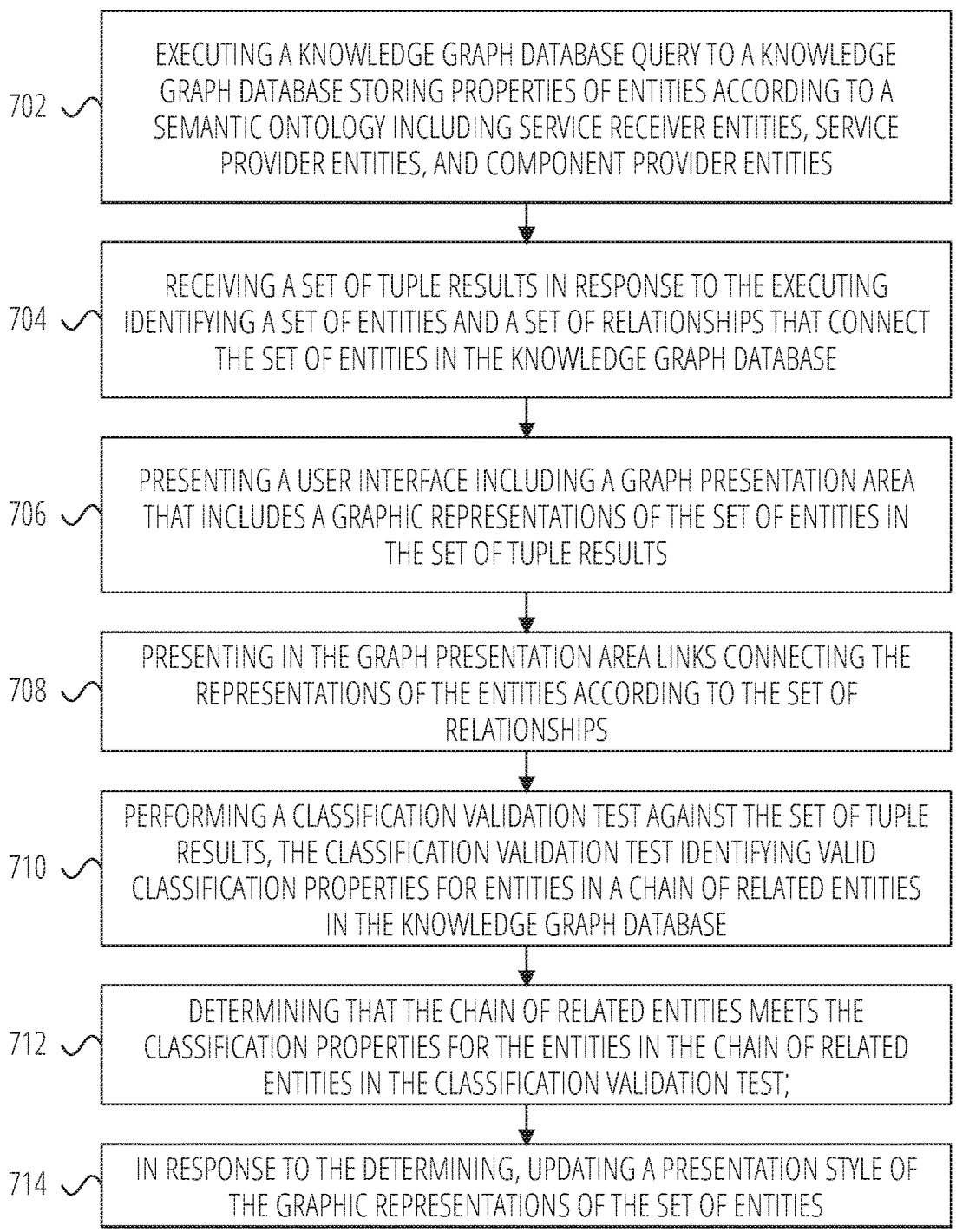
FIG. 7 is a flowchart illustrating a method to view results of a graph logic rule, according to various examples.

FIG. 7 is a flowchart illustrating a method to view results of a graph logic rule, according to various examples. The method is represented as a set of blocks that describe operations 702 to 714. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 7. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

According to various examples, the method includes executing a knowledge graph database query to a knowledge graph database storing properties of entities according to a semantic ontology including service receiver entities, service provider entities, and component provider entities at operation 702. For example, the knowledge graph database query may be issued to production knowledge graph 330 using search component 328. The search may be for a service provider, in various examples.

According to various examples, the method includes receiving a set of tuple results in response to the executing identifying a set of entities and a set of relationships that connect the set of entities in the knowledge graph database at operation 704. For examples, the set of tuple results may be triples from production knowledge graph 330 such as depicted in graph triple table 610.

According to various examples, the method includes presenting a user interface including a graph presentation area that includes graphical representations of the set of entities in the set of tuple results at operation 706. According to various examples, the method includes presenting in the graph presentation area links connecting the graphical representations of the entities according to the set of relationships at operation 708. For example, the graphic representations of the set of entities and links may be of a type such as depicted in graph presentation area 606.

According to various examples, the method includes performing a classification validation test against the set of tuple results, the classification validation test identifying valid classification properties for entities in a chain of related entities in the knowledge graph database at operation 710. For example, the classification validation test may be a graph logic rule such as discussed above. Thus, there may a set of rule parameters that identify an entity type and a value for a particular property of the entity. The performance of the classification validation test may be completed by graph traversal component 336 and search component 328. In various examples, prior to the performing of the classification validation test, the method may include determining a role associated with a current user is authorized to view results of the classification validation test. For example, a query may be made to user accounts 320. In various examples, the chain of related entities includes a service entity, a service provider entity, and a component provider entity.

According to various examples, the method includes determining that the chain of related entities meets the classification properties for the entities in the chain of related entities in the classification validation test at operation 712. For example, graph traversal component 336 may indicate that a chain of related entities in production knowledge graph 330 meet the respective classification properties of the classification validation test.

According to various examples, the method includes in response to the determining, updating a presentation style of the graphic representations of the set of entities at operation 714. For example, updating may include determining an identifier of an entity in the chain of related entities (e.g., by examining a triple in the results). The identifier may be used to determine a type of the entity. For example, the entity may be a service entity. The method may include selecting an additional graphic based on the identifier of the entity and adding the additional graphic to a graphical representation of the entity in the graph presentation area. For example, a value of a criticality property of the service entity in the chain of related entities may be determined to be critical (e.g., by examining a triple). Then, in response to determining, the method may include updating the representation of the entity in the graph presentation area to include the additional graphical indicator. The additional graphical indicator may be an icon that is presented adjacent to the graphical representation of the entity. For example, the additional graphic may be one such as property indicator 636.

In various examples, the operations of the method may further include presenting in the user interface, a graph logic rule pane including: a description label of the classification validation test; and identifiers of the entities in the chain of related entities. The graph logic rule pane may further identify the classification property values of the entities in the chain of related entities. The graph logic pane may be one such as graph logic rule pane 608.

Figure 8:
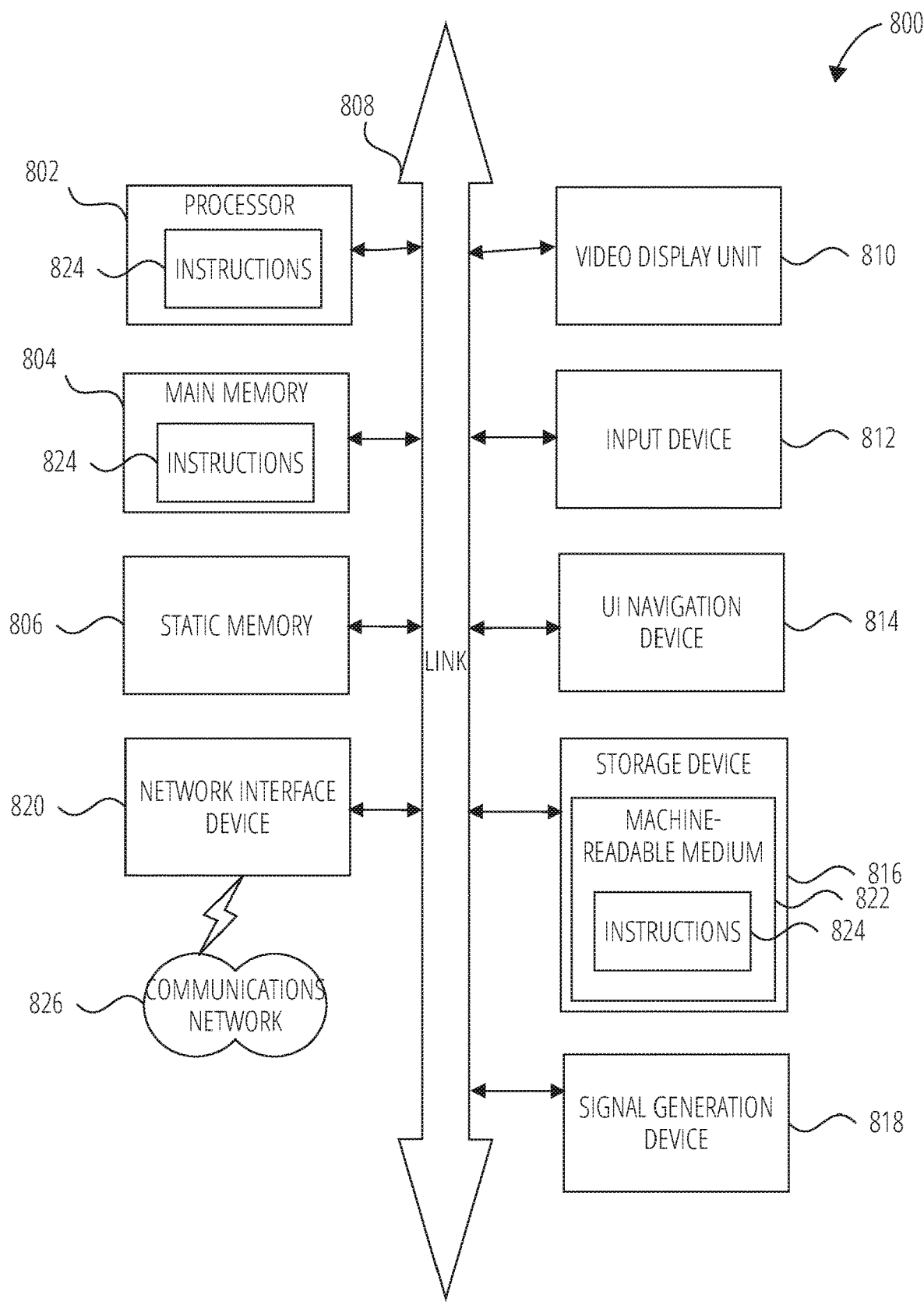
FIG. 8 is a block diagram illustrating a machine in the example form of computer system, within which a set or sequence of instructions may be executed to cause the machine to perform any one of the methodologies discussed herein, according to various examples.

FIG. 8 is a block diagram illustrating a machine in the example form of computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808. The computer system 800 may further include a video display unit 810, an input device 812 (e.g., a keyboard), and a user interface (UI) navigation device 814 (e.g., a mouse). In one embodiment, the video display unit 810, input device 812, and UI navigation device 814 are incorporated into a single device housing such as a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensors.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed Database, and/or associated caches and servers) that store the one or more instructions 824. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 822 that excluded transitory signals.

The instructions 824 may further be transmitted or received over a communications network 826 using a transmission medium via the network interface device 820 utilizing any one of a number of well-known transfer protocols (e.g., HTTPS). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving an input query for an entity in a knowledge graph database,
   executing a knowledge graph database query to the knowledge graph database with the input query, the knowledge graph database storing properties of entities according to a semantic ontology including service receiver entities, service provider entities, and component provider entities;
   receiving a set of tuple results stored in the knowledge graph database in response to the executing, the set of tuple results identifying a set of entities and a set of relationships that connect the set of entities in the knowledge graph database;
   presenting a user interface, the user interface including a graph presentation area that includes:
      a search input element configured to receive the input query;
      graphical representations of the set of entities in the set of tuple results; and
      links connecting the representations of the entities according to the set of relationships;
   performing a classification validation test against the set of tuple results, the classification validation test identifying classification properties for entities in a chain of related entities in the knowledge graph database;
   determining that the chain of related entities meets the classification properties for the entities in the chain of related entities in the classification validation test; and
   in response to the determining, updating a presentation style of the graphical representations of the set of entities.

2. The method of claim 1, further comprising:
   prior to the performing of the classification validation test, determining a role associated with a current user is authorized to view results of the classification validation test.

3. The method of claim 1, wherein updating the presentation style of the graphical representations of the set of entities includes:
   determining an identifier of an entity in the chain of related entities;
   selecting an additional graphic based on the identifier of the entity; and
   adding the additional graphic to a representation of the entity in the graph presentation area.

4. The method of claim 3, wherein the entity is a service entity, and wherein adding the additional graphic to the representation of the entity in the graph presentation area comprises:
   determining a value of a criticality property of the service entity in the chain of related entities is critical; and
   in response to determining the value, updating the representation of the entity in the graph presentation area to include the additional graphic.

5. The method of claim 3, further comprising:
   presenting in the user interface a graph logic rule pane including:
   a description label of the classification validation test; and
   identifiers of the entities in the chain of related entities.

6. The method of claim 5, wherein the graph logic ruled pane further includes classification property values of the entities in the chain of related entities.

7. The method of claim 1, wherein the chain of related entities includes a service entity, a service provider entity, and a component provider entity.

8. A non-transitory computer-readable medium comprising instructions, which when executed by a processing unit, configure the processing unit to perform operations comprising:
receiving an input query for an entity in a knowledge graph database,
executing a knowledge graph database query to the knowledge graph database with the input query, the knowledge graph database storing properties of entities according to a semantic ontology including service receiver entities, service provider entities, and component provider entities;
receiving a set of tuple results stored in the knowledge graph database in response to the executing, the set of tuple results identifying a set of entities and a set of relationships that connect the set of entities in the knowledge graph database;
presenting a user interface, the user interface including a graph presentation area that includes:
a search input element configured to receive the input query;
graphical representations of the set of entities in the set of tuple results; and
links connecting the representations of the entities according to the set of relationships;
performing a classification validation test against the set of tuple results, the classification validation test identifying classification properties for entities in a chain of related entities in the knowledge graph database;
determining that the chain of related entities meets the classification properties for the entities in the chain of related entities in the classification validation test; and
in response to the determining, updating a presentation style of the graphical representations of the set of entities.

9. The non-transitory computer-readable medium of claim 8, wherein the instructions, which when executed by the processing unit, further configure the processing unit to perform operations comprising:
prior to the performing of the classification validation test, determining a role associated with a current user is authorized to view results of the classification validation test.

10. The non-transitory computer-readable medium of claim 8, wherein updating the presentation style of the graphical representations of the set of entities includes:
determining an identifier of an entity in the chain of related entities;
selecting an additional graphic based on the identifier of the entity; and
adding the additional graphic to a representation of the entity in the graph presentation area.

11. The non-transitory computer-readable medium of claim 10, wherein the entity is a service entity, and wherein adding the additional graphic to the representation of the entity in the graph presentation area comprises:
determining a value of a criticality property of the service entity in the chain of related entities is critical; and
in response to determining the value, updating the representation of the entity in the graph presentation area to include the additional graphic.

12. The non-transitory computer-readable medium of claim 10, wherein the instructions, which when executed by the processing unit, further configure the processing unit to perform operations comprising:
presenting in the user interface a graph logic rule pane including:
a description label of the classification validation test; and
identifiers of the entities in the chain of related entities.

13. The non-transitory computer-readable medium of claim 12, wherein the graph logic ruled pane further includes classification property values of the entities in the chain of related entities.

14. The non-transitory computer-readable medium of claim 8, wherein the chain of related entities includes a service entity, a service provider entity, and a component provider entity.

15. A system comprising:
a processing unit; and
a storage device comprising instructions, which when executed by the processing unit, configure the processing unit to perform operations comprising:
receiving an input query for an entity in a knowledge graph database,
executing a knowledge graph database query to the knowledge graph database with the input query, the knowledge graph database storing properties of entities according to a semantic ontology including service receiver entities, service provider entities, and component provider entities;
receiving a set of tuple results stored in the knowledge graph database in response to the executing, the set of tuple results identifying a set of entities and a set of relationships that connect the set of entities in the knowledge graph database;
presenting a user interface, the user interface including a graph presentation area that includes:
a search input element configured to receive the input query;
graphical representations of the set of entities in the set of tuple results; and
links connecting the representations of the entities according to the set of relationships;
performing a classification validation test against the set of tuple results, the classification validation test identifying classification properties for entities in a chain of related entities in the knowledge graph database;
determining that the chain of related entities meets the classification properties for the entities in the chain of related entities in the classification validation test; and
in response to the determining, updating a presentation style of the graphical representations of the set of entities.

16. The system of claim 15, wherein the instructions, which when executed by the processing unit, further configure the processing unit to perform operations comprising:
prior to the performing of the classification validation test, determining a role associated with a current user is authorized to view results of the classification validation test.

17. The system of claim 15, wherein updating the presentation style of the graphical representations of the set of entities includes:
determining an identifier of an entity in the chain of related entities;
selecting an additional graphic based on the identifier of the entity; and adding the additional graphic to a representation of the entity in the graph presentation area.

18. The system of claim 17, wherein the entity is a service entity, and wherein adding the additional graphic to the representation of the entity in the graph presentation area comprises:
   determining a value of a criticality property of the service entity in the chain of related entities is critical; and
   in response to determining the value, updating the representation of the entity in the graph presentation area to include the additional graphic.

19. The system of claim 17, wherein the instructions, which when executed by the processing unit, further configure the processing unit to perform operations comprising:
   presenting in the user interface a graph logic rule pane including:
   a description label of the classification validation test; and
   identifiers of the entities in the chain of related entities.

20. The system of claim 19, wherein the graph logic ruled pane further includes classification property values of the entities in the chain of related entities.

* * * * *